United States Patent [19]

Veitl et al.

[11] 4,137,616

[45] Feb. 6, 1979

[54] METHOD OF PRODUCING A CLAD SHAPED BODY

[75] Inventors: Giswalt Veitl; Ekkehard Auer, both of Linz, Austria

[73] Assignee: Vereinigte Österreichische Eisen- und Stahlwerke - Alpine Montan Aktiengesellschaft, Linz, Austria

[21] Appl. No.: 869,805

[22] Filed: Jan. 16, 1978

[30] Foreign Application Priority Data

Jan. 26, 1977 [AT] Austria ................................. 452/77

[51] Int. Cl.² ............................ B23P 3/14; C23C 5/00
[52] U.S. Cl. ........................................ 29/19; 29/424;
29/527.2; 148/11.5 F; 148/12 R; 228/158;
228/208; 113/120 R
[58] Field of Search ................ 29/19, 423, 424, 527.1,
29/527.2, 527.7, DIG. 32, DIG. 45; 148/11.5
F, 12 R, 12.1; 228/2.5, 107, 117, 141 A, 158,
208, 210; 428/209, 457; 75/175.5; 113/120 R

[56] References Cited

U.S. PATENT DOCUMENTS

| 2,786,265 | 3/1957 | Keay | 228/158 |
|---|---|---|---|
| 2,993,269 | 7/1961 | Kelley | 29/424 |
| 3,015,885 | 1/1962 | McEuen | 29/19 |
| 3,125,805 | 3/1964 | Horigan | 228/208 |
| 3,238,071 | 3/1966 | Holtzman et al. | 228/107 |
| 3,798,747 | 3/1974 | Lalwaney | 228/107 |

FOREIGN PATENT DOCUMENTS 772859 4/1957 United Kingdom.
1042604 9/1966 United Kingdom.

*Primary Examiner*—Michael J. Keenan
*Attorney, Agent, or Firm*—Brumbaugh, Graves, Donohue & Raymond

[57] ABSTRACT

A method of producing a clad shaped body by roll-bond cladding of a sandwich-like cladding package closed on all sides, which is evacuated before being heated to rolling temperature employs a metallic intermediate layer comprised of a pure iron sheet provided between the base material comprised of steel and the cladding material comprised of titanium.

8 Claims, No Drawings

METHOD OF PRODUCING A CLAD SHAPED BODY

The invention relates to a method of producing a clad shaped body by roll-bond cladding of a sandwich-like cladding package closed on all sides, which is evacuated before being heated to rolling temperature, a metallic intermediate layer being provided between the base material steel and the cladding layer comprised of titanium.

Shaped bodies clad with titanium, in particular sheet or plate, are of great technological importance to the chemical apparatus construction, due to their special corrosion properties.

There have been known various methods of producing sheet or plate clad with titanium, but difficulties have arisen by the formation of brittle intermetallic compounds, by carbonisation during rolling as well as by the coaction of the cladding layer with hydrogen, oxygen and nitrogen gases. In order to overcome these difficulties it has been known from Austrian Pat. No. 214,242 to clad steel with a cladding layer of titanium by using several different intermediate layers, according to the roll-bond cladding procedure. This method consists in that, between the base material and the cladding layer towards the steel side, a nickel-copper layer, and towards the cladding layer, a silver layer or a silver-manganese alloy are provided. The utilisation of nickel and copper on the one hand and of silver of silver-manganese on the other hand as intermediate double layer can, with regard to the plurality of alloying elements and the procedural steps necessary for applying these alloys, be considered technically too complex and too susceptible to failure in the rough steel making plant operation, so that this cladding method is not very useful for application on an industrial scale, in particular for clad shaped bodies of large dimensions. Moreover, phases will easily form when using this intermediate double layer, which are difficult to deform and lead to disturbances during the hot rolling procedure.

The invention aims at avoiding these disadvantages and difficulties and has as its object to create a method of the above-defined kind, wherein the formation of brittle intermetallic compounds, carbonisation as well as reaction of the cladding material with hydrogen, oxygen and nitrogen gases are avoided. Furthermore the method shall be suitable for the rough steel making plant operation, i.e. the method shall neither be particularly complex nor require special care. A further object is that also shaped bodies with large dimensions can be produced easily, thus requiring only minimum welding seams connecting the clad sheets or plates.

These objects are achieved according to the invention by covering the cladding layer, before making up the cladding package, at least on the side facing the base material, with a pure iron sheet, by advantageously connecting the same with the pure iron sheet by explosion cladding, and by evacuating the complete cladding package at a temperature from 100° to 150° C. and finally rolling it at a temperature range of 650°-750° C.

By the pure iron layer the cladding layer is reliably protected against taking up the gases emerging from the base material when the latter is heated to rolling temperature. The observance of the temperature range of 110° to 150° C. during evacuation is of importance in order to safeguard the removal of condensation water possibly present within the package. Applying the pure iron layer by explosion cladding has the advantage that the pure iron layer is connectable with the cladding layer sufficiently strong and without forming intermetallic compounds, so that welding by roll-bond cladding has to occur only between the pure iron layers and between the pure iron layer and the base material of steel, respectively. For this type of welding the low rolling temperatures of between 650° and 750° C. are sufficient; the connection between the pure iron layers and the pure iron layer and the base material, respectively, shows a sufficient adhesive strength after that rolling procedure. Due to the low rolling temperatures a diffusion of iron or carbon into the cladding layer is prevented.

According to one embodiment of the invention the cladding layer can be pretreated in a galvanic iron bath, thus being electrolytically covered with a thin iron layer.

If the product coming from roll-bond cladding shall be subjected to a further hot forming process, such as pressing or up and down coiling, the cladding layer is advantageously covered with a pure iron sheet on all sides, the edges of the cladding layer suitably being wedgedly chamfered before being covered with the pure iron sheet. By this, the clad shaped body is provided with a protective layer on its surface covered with the cladding layer, which protective layer is removed only after a hot forming process, such as coiling to container drums or pressing to container bottoms, following the roll-bond cladding process.

The invention shall now be described in detail by way of the following examples:

EXAMPLE 1

A titanium sheet or plate was intended to be clad on a base material, a boiler plate of the quality ASTM A 516, grade 70. For the formation of a sandwich-like cladding package two slabs of the base material, each having the dimensions 2,000 × 1,100 × 210 mm, and two titanium plates, each having the dimensions 1,900 × 1,000 × 30 mm were provided. Before assembling the cladding package the titanium plates were coated electrolytically with pure iron and then covered with 2 mm pure iron sheets. The cladding package produced of these plates and slabs pretreated like above, in which the two superimposed titanium plates, between which a separating means was put, were layed between the slabs of the base material, was vacuumsealed with a welding seam extending around it; the sealing of the package was carried out under a press. After evacuation of the package at a temperature of 110° to 150° C. to a vacuum of $10^{-4}$ Torr, the package was heated to 720° C. Hot rolling was carried out at a temperature range of 720° to 680° C. The dimensions of the rolled crude panel were 5,220 × 4,200 mm. After separating of the package two clad plates were obtained, with a thickness of 21 + 3 mm each. Of these clad plates basket arch bottoms were to be produced. Rounds with a diameter of 3,700 mm were cut, heated to 850° C. for a short time and pressed to basket arch bottoms with a diameter of 3,000 mm, when still hot. The last working step was the grinding off of the pure iron layer protecting the surface of the cladding layer during hot pressing.

EXAMPLE 2

A coating of titanium was to be applied to a boiler plate of the quality H IV according to DIN 17155. At first, two titanium plates with the dimensions 2,000 × 1,400 × 20 mm each were explosion-clad on both sides with 2 mm pure iron sheets. Before, the edges of the cladding layer had been wedgedly chamfered so that the cladding layer was all covered by the pure iron sheets. A pure iron sheet was used which contained maximally 0.006% carbon. The dimensions of the slabs of the base material were 2,100 × 1,500 × 150 mm. A package was built from the titanium plates covered with pure iron as well as the slabs of the base material in a usual way, with titanium plates lying between the slabs, which package was thoroughly welded all around, the welding process taking place under the pressure of a press in order to keep the amount of air within the package as small as possible. Afterwards, the package was laterally spot-drilled, provided with a vacuum seal and evacuated under pressures between $10^{-2}$ and $10^{-5}$ Torr. Evacuation of the roll-bond cladding package was carried out at a temperature from 110° to 150° C. Then the package was heated to 680° to 720° C. and rolled to a crude panel having the dimensions 11,400 × 2,780 × 34.4 mm. After separation of the package, two plates were obtained, each clad on one side with titanium and having a thickness of 15 + 2.2 mm, the titanium surface being covered with a 0.2 mm pure iron layer. This pure iron layer was removed only in the last working step, by grinding off after further hot forming. The size of the finished plates was 10,000 × 2,500 × 15 + 2 mm, thus lying far beyond the width and length of titanium clad sheet or plate so far achieved.

We claim:

1. In a method of producing a clad shaped body of a base material comprised of steel and a cladding layer comprised of titanium by roll-bond cladding a sandwich-like cladding package closed on all sides, which cladding package, before being heated to rolling temperature, is evacuated, a metallic intermediate layer being provided between said base material and said cladding layer, the improvement comprising covering said cladding layer with a pure iron sheet before making up said cladding package and at least where the cladding layer faces said base material, said pure iron sheet being said metallic intermediate layer, evacuating said sandwich-like cladding package closed on all sides at a temperature of between 110 and 150° C, and rolling said cladding package at a temperature range of between 650 and 750° C.

2. A method as set forth in claim 1, wherein said pure iron sheet is bonded to said cladding layer by explosion cladding.

3. A method as set forth in claim 1, wherein said cladding layer is pretreated in a galvanic iron bath.

4. A method as set forth in claim 1, wherein said cladding layer is covered with said pure iron sheet on all sides.

5. A method as set forth in claim 4, wherein said cladding layer has edges, and said edges are wedgedly chamfered before being covered with said pure iron sheet.

6. A method as set forth in claim 4, wherein said pure iron sheet on said cladding layer where said cladding layer does not face said base material is removed after a hot forming step following roll-bond cladding.

7. A method as set forth in claim 6, wherein said hot forming step comprises coiling to form container drums.

8. A method as set forth in claim 6, wherein said hot forming step comprises pressing to form container bottoms.

* * * * *

UNITED STATES PATENT OFFICE
CERTIFICATE OF CORRECTION

Patent No. 4,137,616          Dated Feb. 6, 1979

Inventor(s) Veitl et al.

It is certified that error appears in the above-identified patent and that said Letters Patent are hereby corrected as shown below:

Col. 1, line 29, "silver of" should read --silver or--; and

Col. 1, line 59, "100°" should read --110°--.

Signed and Sealed this

Twelfth Day of June 1979

[SEAL]

Attest:

RUTH C. MASON
Attesting Officer

DONALD W. BANNER
Commissioner of Patents and Trademarks